United States Patent [19]
Putland et al.

[11] Patent Number: 5,704,583
[45] Date of Patent: Jan. 6, 1998

[54] RANGE POLE DATA COLLECTOR HOLDER

[75] Inventors: Charles Putland, Cupertino; Mark Warneke, Sunnyvale; Peter Langlotz, Half Moon Bay, all of Calif.

[73] Assignee: Trimble Navigation Limited, Sunnyvale, Calif.

[21] Appl. No.: 632,532

[22] Filed: Apr. 12, 1996

[51] Int. Cl.⁶ .................................................. F16M 3/00
[52] U.S. Cl. .................................... 248/674; 248/300
[58] Field of Search ............................. 248/674, 300, 248/309.1, 218.4, 205.1, 313, 316.1, 918; 33/299

[56] References Cited

U.S. PATENT DOCUMENTS

| | | | |
|---|---|---|---|
| 3,934,353 | 1/1976 | Haines | 33/262 |
| 4,514,105 | 4/1985 | Adams et al. | 248/674 X |
| 4,641,804 | 2/1987 | Martin et al. | 248/205.1 |
| 4,879,816 | 11/1989 | Slerk | 33/295 |
| 5,512,905 | 4/1996 | Nichols et al. | 342/357 |

*Primary Examiner*—Ramon O. Ramirez
*Attorney, Agent, or Firm*—Patrick T. King

[57] ABSTRACT

An apparatus for securing a GPS data collector to a range pole includes an elongated base plate. The base plate has sidewalls, retaining wings, at least one first tab resiliently mounted perpendicularly to the base plate, at least one bottom support lip extending normally upward from the bottom of the base plate, and at least one second tab mounted to the bottom support lip and extending upward parallel to the base plate. Each of the tabs are adapted to engage a corresponding slot in the lower end of a data collector and the wings constrain the head end of a data collector unit.

14 Claims, 4 Drawing Sheets

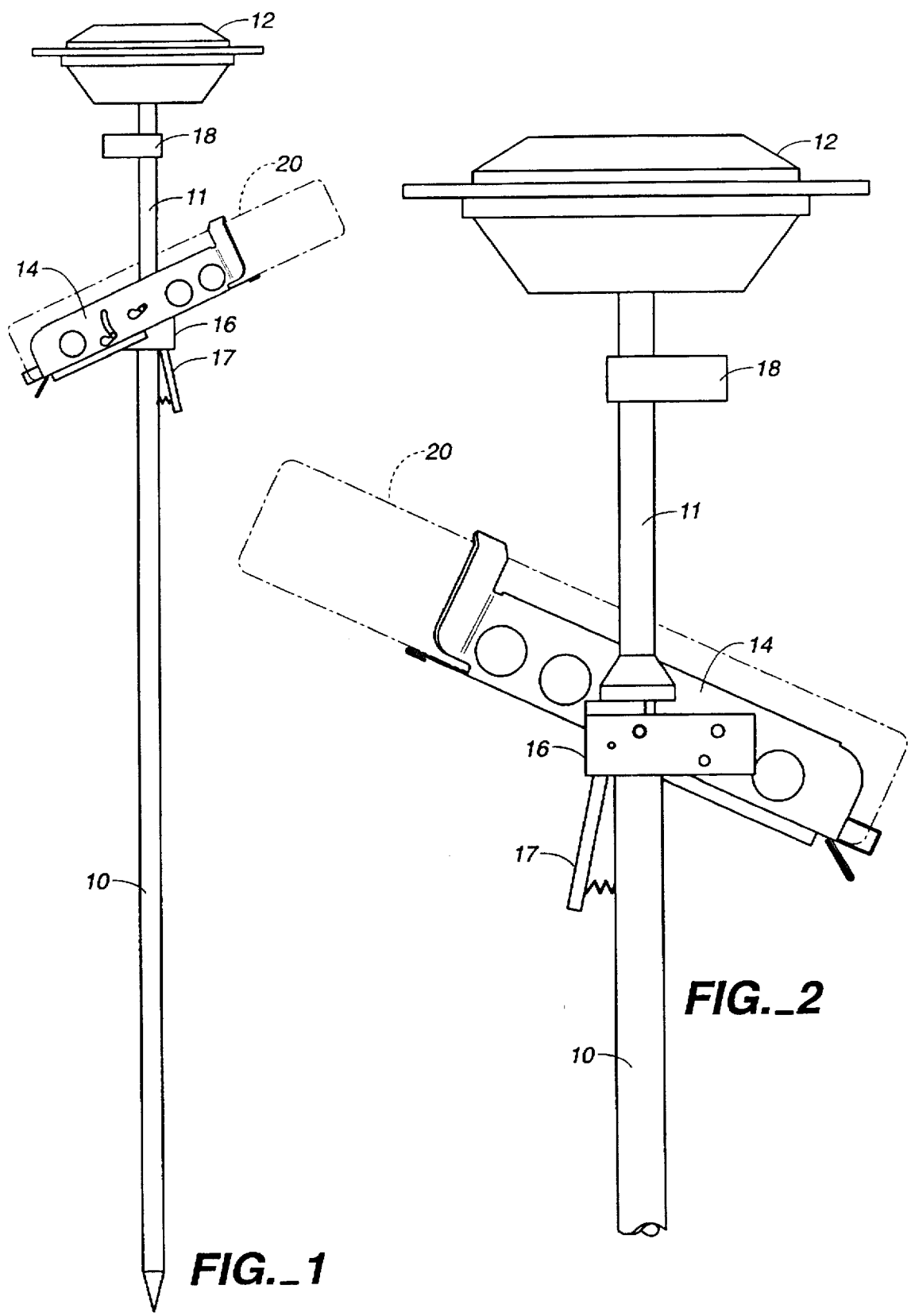

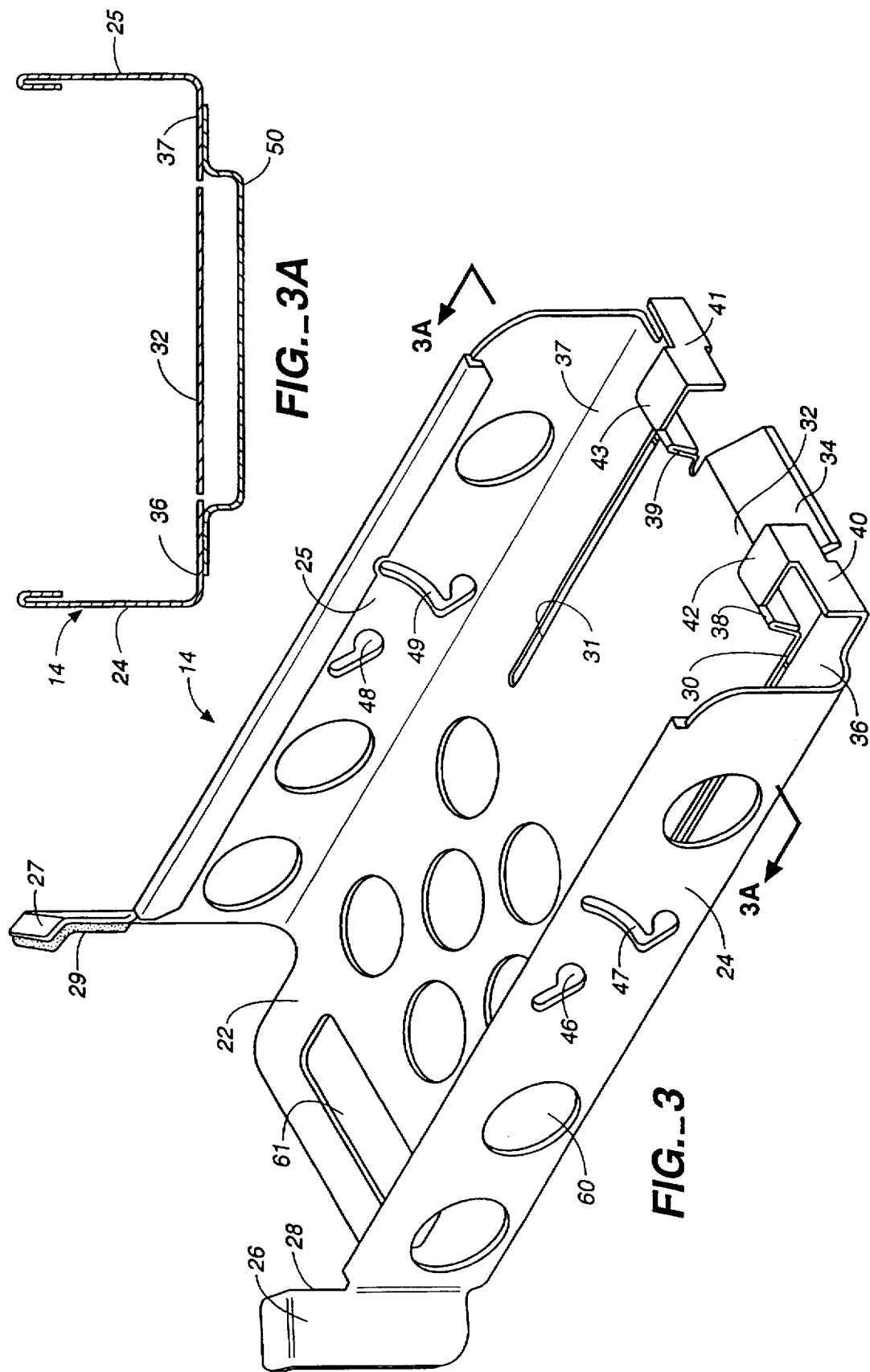

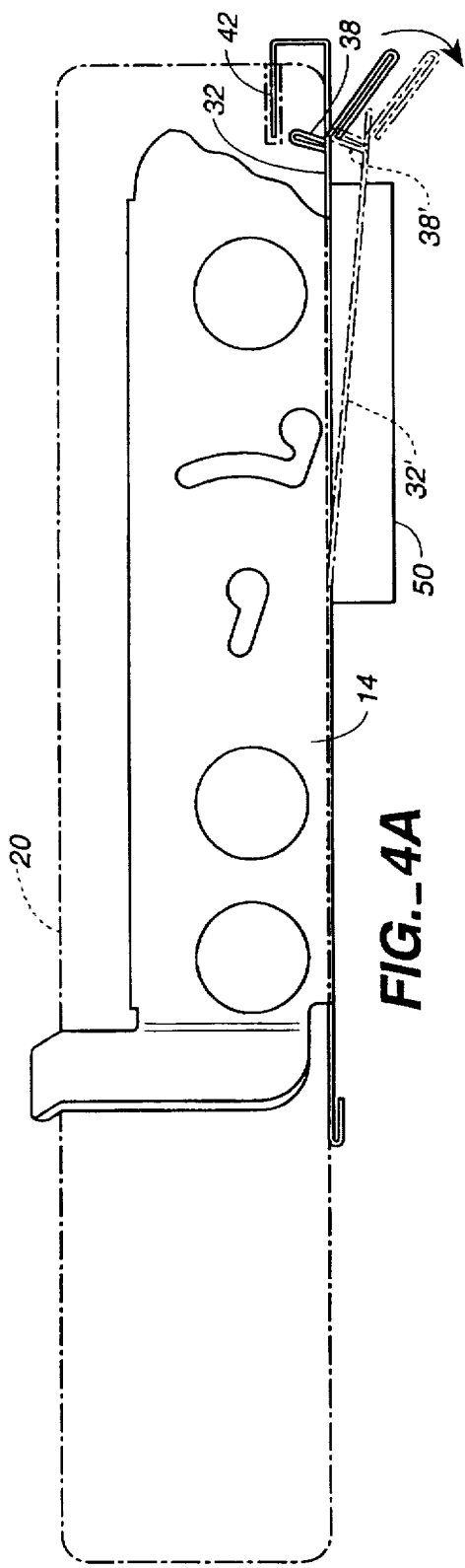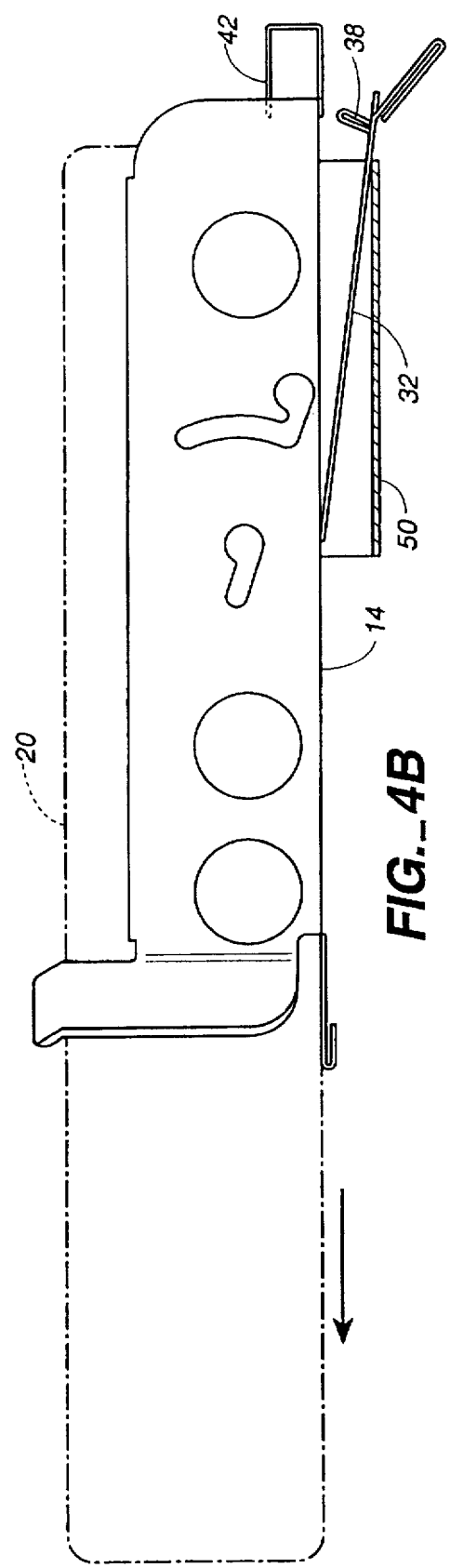

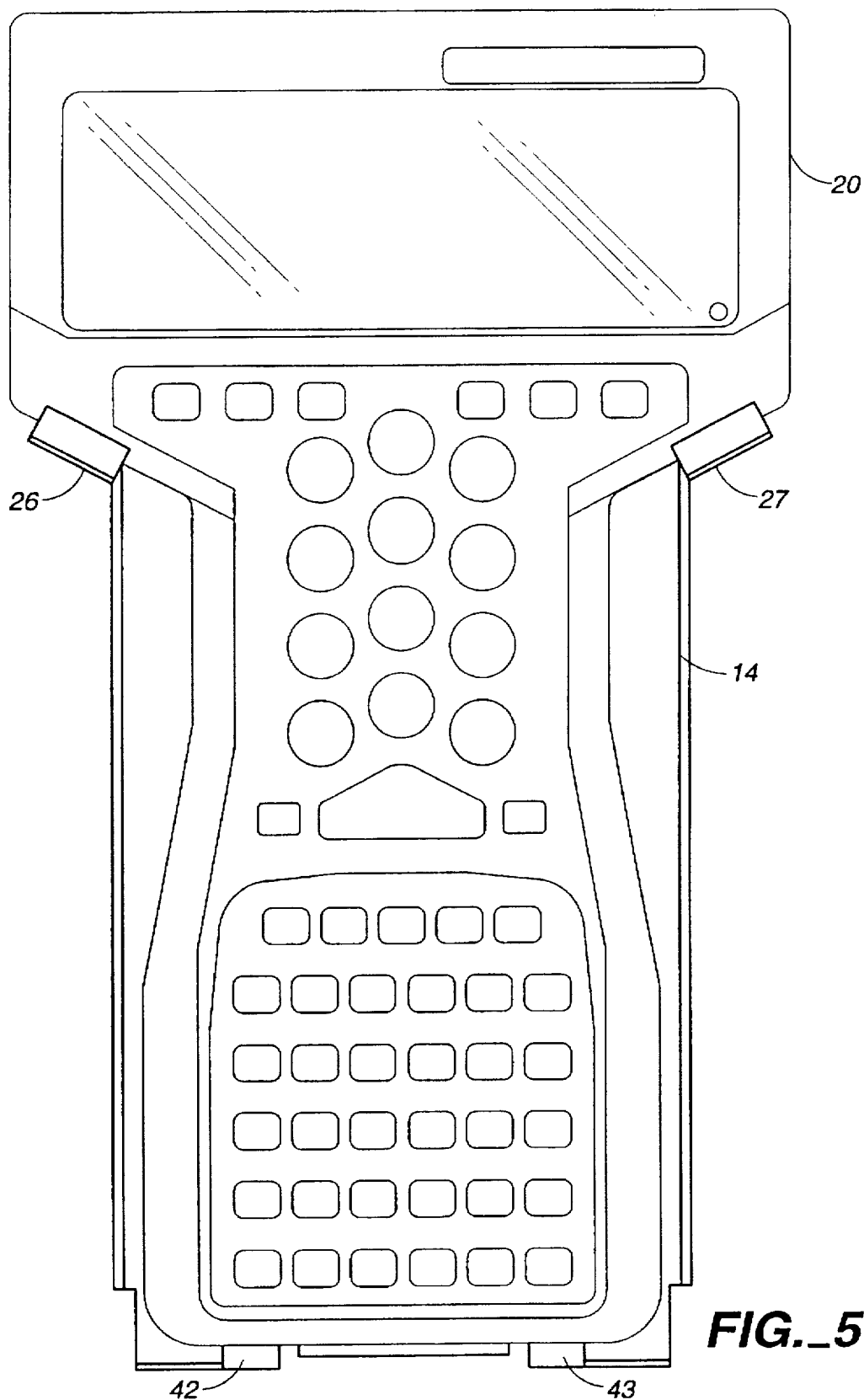
FIG._5

RANGE POLE DATA COLLECTOR HOLDER

BACKGROUND OF THE INVENTION

1. Field of the Invention

This invention is directed generally to surveying instruments and, more particularly, to a holder for mounting a data collector unit for a global positioning system (GPS) to a range pole.

2. Prior Art

A range pole traditionally has been used by one member of a survey party to locate a particular reference point. The range pole is visible at a distance to others in the survey party, so that distances to the range pole can be determined, or ranged.

Modern surveying systems use GPS to determine the longitude, latitude, and altitude of points being surveyed. A GPS antenna and receiver are required at the surveying site during the time of operation. The GPS antenna may be separate. Alternatively, a GPS receiver may include a built-in antenna and signal processing circuits mounted inside a housing for a GPS antenna/receiver. During surveying operations, the GPS antenna, or GPS antenna/receiver, is mounted, or fixed, on the top end of a range pole.

GPS-based surveying systems also use computerized data collectors to collect and store field data. For entering data into the data collectors, keyboards and data input ports which are electrically coupled to a GPS receiver are provided. Data collectors are hand held by an operator or are secured to a range pole supporting a GPS antenna/receiver. Typically, a holder device is used for securing a computerized data collector to a range pole. However, prior art holders do not provide adequate stability for holding the data collector in place while the range pole is jostled about in the field. Typical data collector holders comprise a base plate, straight sidewalls, and a retentive lip extending normally inward from the top edge of the straight sidewalls to hold a data collector in place.

The holders used in the prior art do not provide convenient means for locking a data collector into a mounting holder to prevent the data collector from sliding out of the mounting holder. A need has arisen for a data collector holder which locks a data collector in position.

SUMMARY OF THE INVENTION

It is therefore an object of the invention to provide a means for securing a data collector to a range pole so as to optimize stability and convenience.

In accordance with these and other objects of the invention, a holder apparatus and a method are provided for securing a GPS data collector to a range pole. The holder apparatus includes a base plate, adapted for being coupled to a range pole, and a base plate having elongated sides, a top end, and a bottom end. Sidewalls extend perpendicularly upward from the base plate at the periphery of the two elongated sides of the base plate. Retaining wings, extending outward from a portion of the sidewalls at the top end of the base plate, are provided for engagement with and for holding in place a widened head portion of the data collector. At least one first tab is resiliently mounted to the base plate and extending perpendicularly upward from a bottom section of the base plate, where the first tab is adapted to engage a corresponding first slot in the data collector. At least one second tab connected to the base plate and extending parallel to the base plate where the second tab is adapted to engage a corresponding second slot in the data collector.

The first tab is mounted to a resilient central leaf portion of the base plate. A finger pull tab extends at an angle from the bottom edge of the central leaf portion of the base plate. The second tab extends from the base plate where the second tab is substantially perpendicular to the first tab. The first tabs, second tabs, finger pull tab, and bottom support lips are formed by cutting slits in the base plate and then bending sections of the base plate at right angles. A multiplicity of holes are cut in the base plate to minimize the weight of the holder. The sidewalls of the holder are folded over to provide added strength and rigidity to the holder and to provide smooth edges to the top of the sidewalls.

A method is provided according to the invention for securing a GPS data collector to a holder adapted to be mounted on a survey range pole. The method includes the steps of a inserting a data collector into the holder until the data collector pushes back a first tab mounted to a resilient leaf portion of a base plate to retract the first tab. The GPS data collector is further inserted until the first tab snap-fit engages a corresponding slot in the foot of the data collector. Alternatively, a finger tab is provided for manually retracting the first tab. A second tab, which extends parallel to the line of insertion of the data collector, engages a corresponding second slot in the data collector. The said resilient leaf on which the first tab is mounted is bent to release the first tab, which allows the GPS data collector to be removed from the holder. The head of the data collector is held by wings which extend from the base plate. The wings engage the sides of the head and have tabs which extend over the peripheral edges of the face area of the data collector.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 is a side elevational view of a range pole having an integral GPS antenna/receiver unit mounted on the top thereof and a holder assembly mounted to the range pole for holding a data collector unit.

FIG. 2 is a somewhat larger, partial elevational view of the opposite side of a range pole having an integral GPS antenna/receiver unit mounted on the top thereof and a holder assembly for holding a data collector.

FIG. 3 is a perspective view of a holder assembly for holding a data collector on a range pole according to the invention.

FIG. 3A is a sectional view taken along sectional line 3A—3A of FIG. 3 and showing a reinforcement bracket fastened to the bottom side of the holder assembly.

FIG. 4A is a partially sectional, side elevational view of a holder assembly for holding a data collector on a range pole showing a centrally located leaf in a normal position and in a flexed position.

FIG. 4B is a partially sectional, side elevational view of a holder assembly for holding a data collector on a range pole showing the centrally located leaf in a flexed position.

FIG. 5 is a plan view of a holder assembly with a data collector inserted therein.

DETAILED DESCRIPTION OF THE PREFERRED EMBODIMENT

Reference will now be made in detail to the preferred embodiment of the invention, examples of which are illustrated in the accompanying drawings. While the invention will be described in conjunction with the preferred embodiment, it will be understood that it is not intended to limit the invention to this embodiment. On the contrary, the invention is intended to cover alternatives, modifications and equivalents, which may be included within the spirit and scope of the invention as defined by the appended claims.

FIG. 1 illustrates a two-piece telescoping range pole which is adjustable in length. The range pole has a lower pole section 10 and an upper pole section 11. A GPS antenna unit 12 is shown mounted on the top end of the upper pole section 11. Alternatively, a GPS antenna/receiver can be mounted on the top end of the upper pole section.

A data collector holder assembly 14 is mounted on a mounting base 16, which is fixed near to the top end of the lower section 10 of the range pole. The mounting base 16 is provided with appropriate threaded holes for mounting the data collector holder assembly 14 thereto. The base 16 also serves as a clamp for holding the top section 11 of the range pole in position with respect to the bottom section 10 of the range pole. A spring-loaded clamping lever 17 on the mounting base 16 is pressed to release the clamp and to permit the pole sections 10, 11 to longitudinally slide with respect to each other to adjust the overall length of the range pole.

An alternative mounting base for a data collector holding assembly is provided by a bubble-level mount 18 which has appropriate threaded mounting holes formed therein for mounting a data collector holding assembly to the range pole. The mount 18 is positioned along the length of the upper pole section 11 by pushing a release button (not shown) and sliding the mount along the pole section 11 to a desired position.

The holder assembly 14 is adapted to hold a GPS data collector unit 20 (shown in phantom) on the range pole for entry of data by a user into a data collector keyboard and for collection of data from a GPS antenna/receiver unit 12.

FIG. 2 shows the opposite side of the range pole of FIG. 1 with the GPS antenna unit 12 mounted on the top thereof. The holder assembly 14 is screwed to the clamp base 16 using screws (not shown) inserted in threaded holes on the clamp base 16. A pattern of unused screw holes is shown in FIG. 2 The holder assembly is mounted with screws to the clamp base 16 using a similar pattern of threaded holes provided on the opposite side of the clamp base 16.

FIG. 3 shows a holder assembly 14 which is formed of sheet metal, such as stainless steel. The holder assembly 14 includes an elongated base plate 22. Two opposing side walls 24, 25 extend perpendicularly upwardly from the periphery of two elongated sides of the base plate 22 to provide lateral support for the long sides of a data collector 20.

Two retaining wings 26, 27 extend outwardly at a 120 degree angle from the side walls 24, 25 at the top end of the base plate 22. The main body of each of the wings 26, 27 are vertical and have upper portions which extend upwardly above the sidewalls. The top ends of the wings 26, 27 are bent at an angle away from vertical to form respective angled tabs 26a, 27a. Resilient pads 28, 29 are located on the inside faces of the respective wings 26, 27. The main body of each wing are designed to engage and provide support to the underside of a wide head portion of a data collector 20. The top end of the wings extend over the peripheral edges of the front face of the data collector.

Two outer longitudinal slits 30, 31 are cut in the base plate 22 from the bottom edge of the base plate to near the middle of the base plate 22. The portion of the base plate 22 between the two outer slits 30,31 forms a centrally located, resilient leaf 32 at the bottom end of the base plate 22. The free end of the resilient leaf 32 terminates in a centrally-positioned finger tab 34 which angles downwardly. An operator can pull the tab 34 downwardly to bend the resilient leaf away from the plane of the base plate 22. The outside-edge portions 36, 37 of the base plate 22 which are between the respective sidewalls 24, 25 and the slits 30, 31 are more rigid than the central leaf 32 due to the adjacent side walls 24, 25.

Two upwardly extending end tabs 38, 39, which are formed in the terminal end of the resilient central leaf 32 next to the tab 34, extend upwardly at an angle of approximately 10 degrees from vertical. These two resiliently mounted end tabs 38, 39 are adapted to snap-fit engage corresponding holes formed in the housing of a data collector 20.

The outside-edge portions 36, 37 of the base plate 22 are extended upwardly to provide a pair of upwardly extending support members 40, 41, each of which terminate in respective inwardly extending tabs 42, 43.

The inwardly extending tabs 42, 43 extend inwardly at a 5 degree angle from the plane of the base 22 and are adapted to engage corresponding holes formed in the bottom end of a data collector.

Slots 46, 47 are formed through the side wall 24 for mounting the holder 14 to the mounting base 16 or to the bubble-level mount 18 shown in FIGS. 1 and 2. Alternative slots 48, 49 are formed through the opposite side wall 25 for alternatively mounting the holder 14 to the mounting base 16 or to the bubble-level mount 18 shown in FIGS. 1 and 2. The slots 46, 47 and 48, 49 are shaped to match different hole patterns in the mounting base 16 or 18. Screws, passing through the slots into threaded holes in the mounting base 16 or mount 18, are tightened to fix the data collector holder in position. Portions of the holes 46, 47 are shaped as elongated arcs which permit the data collector holder to be rotated through approximately 30 degrees to provide for adjustment of the viewing and operating angle of a data collector.

FIG. 3A is a sectional view taken along sectional line 3A—3A of FIG. 3 and showing a reinforcement bracket 50 fastened to the bottom side of the holder assembly to provide added strength and rigidity to the lower end of the holder 14 and to limit the travel of the leaf 32. The reinforcement bracket 50 is connected between the outside-edge portions 36, 37 of the base plate 22. The reinforcement bracket 50 has respective end regions which are parallel to the outside-edge portions of the base plate 22. The end regions are fixed to the respective outside-edge portions of the base plate 22 by, for example, spot welds or alternatively by rivets. The reinforcement bracket 50 has a central planar region which is somewhat wider than the leaf 32. The reinforcement bracket is parallel to the resilient leaf 32 in its rest position in the plane of the base plate 22. The central planar region of the reinforcement bracket 50 is offset from the resilient leaf 32 by approximately one quarter of an inch to limit the travel of the free end of the leaf to approximately one quarter of an inch.

Referring to FIG. 3, a number of holes (typically shown as 60) are formed in the holder 14 to reduce the weight of the holder. A slot 61 is provided in the upper end of the base plate 22 to accommodate a hand strap, the respective ends of which are attached to the top and bottom areas on the backside of the housing of the data collector 20. The hand strap through the slot 61 is used to assist with holding the data collector 20 in the holder 14.

FIG. 4A shows a side view of a holder assembly 14 showing a data collector 20 in phantom lines positioned in placer in the holder assembly 14. The resilient leaf 32 is shown in solid lines in its normal horizontal position in which the tabs 38, 39 and the tabs 42, 43 engage corresponding slots in the data collector 20. FIG. 4A alternatively shows in phantom lines the resilient leaf 32 flexed downwardly to release the tab 38 from the corresponding slot in the data collector 20. The reinforcement bracket 50 is shown fixed to the bracket 14.

FIG. 4B also shows a side view of a holder assembly 14. In this view the resilient leaf 32 is shown in solid lines flexed downwardly to have released the tab 38 from the corresponding slot in the data collector 20. The data collector 20 is shown in a position where it has been moved away from engagement with the tabs 38 and 42 and can be released from the holder 14. The reinforcement bracket 50 is shown fixed to the bracket 14 to limit the travel of the resilient leaf 32 with the tab 38 fixed thereto.

FIG. 5 a view of a data collector holder assembly 14 with a data collector 20 inserted therein. The wings 26, 27 engage the wider head portion of the data collector 20. Tabs 42, 43 are shown engaging slots in the foot of the data collector 20.

In operation, the holder assembly 14 is coupled to the mounting base 16 or 18 fixed to the range pole section 10 or 11. The data collector 20 is inserted into the holder 14 until the bottom end of the data collector 20 contacts the resilient tabs 38, 39 and pushes the resiliently mounted tabs 38, 39 away from the data collector 20. The tabs extend a slight angle away from vertical to permit this. The tabs then slide along the back surface of the data collector 20 until they snap into corresponding slots in the back side of the data collector 20. Alternatively, the tabs 38, 39 can be pulled back by an operator using the 34 to remove the tabs 38, 39 from the path of the data collector 20. The data collector 20 also slides into the holder 14 until the tabs 42, 43, which are oriented parallel to the line of insertion, engage corresponding slots in the data collector 20.

The head end of a data collector 20 as shown in FIG. 5 is constrained from movement by the wings 26, 27. The main body of each wing 26, 27 with their resilient pads 26, 27 engage and provide support to the underside of the wide head portion of the data collector 20, as illustrated in FIG. 5. The tabs 26a and 27a at the top end of the wings extend over the peripheral edges of the front face of the data collector to prevent the data collector from sliding along the wings away from the base 22.

The foot end of the data collector is locked in the bracket by engagement of the tabs 38, 39 with corresponding slots in the lower back side of the data collector 20 and by engagement of the tabs 42, 43 with corresponding slots in the bottom end of the data collector unit.

To remove the data collector 20 form the holder 14, the finger pull tab 34 is pulled down to remove the tabs 38, 39 from their corresponding slots in the data collector 20. The data collector 20 is then slide upward until the wings 26, 27 are cleared and the data collector is removed from between the sidewall 24, 25.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A holder apparatus for securing a GPS data collector to a range pole, comprising:

a base plato having elongated opposing sides, a top end, and a bottom end;

retaining wings, extending outwardly from the base plate, for engagement with and for holding in place a head portion of a GPS data collector;

at least one first tab resiliently mounted to the base plate and extending perpendicularly upward from a bottom section of the base plate, said first tab being adapted to engage a corresponding first slot in the GPS data collector;

at least one second tab connected to the base plate and extending parallel to the base plate and at angle with respect to the first tab, said second tab being adapted to engage a corresponding second slot in the GPS data collector;

wherein the holder apparatus is adapted to being mounted to a range pole and whereby the holder apparatus secures the GPS data collector by the retaining wings engaging with the widened head portion of the data collector, by the at least one resiliently-mounted first tab snap-fit engaging a corresponding first slot in the data collector, and by the at least one second tab engaging a corresponding second slot in the data collector.

2. The holder apparatus of claim 1 wherein the retaining wings include angled tabs formed at the ends thereof for extending over and engaging a face of the GPS data collector.

3. The holder apparatus of claim 1 wherein the elongated opposing sides include opposing sidewalls extending perpendicularly upward from the base plate at the periphery of the two elongated sides of the base plate, said sidewalls having the retaining wings extending therefrom.

4. The holder apparatus of claim 1 wherein the sidewall have holes formed therein which are adapted to accommodate fasteners to fasten one of the sidewalls to a range pole and to adjustably position the GPS data collector at a predetermined viewing angle.

5. The holder apparatus of claim 1 wherein the first tab is mounted to a resilient central leaf portion of the base plate.

6. The holder apparatus of claim 5 including a reinforcement bracket fixed to the base plate and extending spaced apart and parallel to the resilient central leaf portion of the base plate to limit the travel of said leaf portion.

7. The holder apparatus of claim 1 wherein the second tab is substantially perpendicular to the first tab.

8. The holder apparatus of claim 1 wherein the first tab and the second tab are integral to the base plate and are formed by cut and bent portions from the base plate.

9. The holder apparatus of claim 1 further comprising a finger pull tab which extends at an angle from the bottom edge of a central leaf portion of the base plate.

10. The holder apparatus of claim 1 wherein top portions of the sidewalls of the holder are folded over for added strength and rigidity.

11. The holder apparatus of claim 1 wherein a multiplicity of holes are cut in the base plate to reduce the weight of the holder.

12. A holder apparatus for securing a GPS data collector adapted to be mounted to a range pole, comprising:

a base plate having elongated opposing sides, a top end, and a bottom end;

opposing sidewalls extending perpendicularly upward from the base plate at the periphery of the two elongated sides of the base plate;

retaining wings, extending outwardly from the sidewalls fixed to the base plate, for engagement with and for holding in place a head portion of a GPS data collector, the retaining wings include angled tabs formed at the ends thereof for extending over and engaging a face of the GPS data collector;

a resilient central leaf portion of the base plate;

a pair of first tabs resiliently mounted to the base plate on the resilient central leaf portion of the base plate and extending perpendicularly upward from the bottom section of the base plate, said first tabs being adapted to engage corresponding first slots in the GPS data collector;

a pair of second tabs connected to the base plate and extending parallel to the base plate and substantially at right angles with respect to the first tabs, said second tabs being adapted to engage corresponding second slots in the GPS data collector;

wherein the holder apparatus secures the GPS data collector by the retaining wings engaging with the widened head portion of the data collector, by the resiliently-mounted first tabs snap-fit engaging corresponding first slots in the data collector, and by the second tabs engaging a corresponding second slots in the data collector.

13. The holder apparatus of claim 12 wherein the sidewall have holes formed therein which are adapted to accommodate fasteners to fasten one of the sidewalls to a range pole and to adjustably position the GPS data collector at a predetermined viewing angle.

14. The holder apparatus of claim 12 including a reinforcement bracket fixed to the base plate and extending spaced apart and parallel to the resilient central leaf portion of the base plate to limit the travel of said leaf portion.

* * * * *